United States Patent [19]

Chen

[11] Patent Number: 4,716,135

[45] Date of Patent: Dec. 29, 1987

[54] ORGANOPHOSPHORUS-MODIFIED ZEOLITES AND METHOD OF PREPARATION

[75] Inventor: Catherine S. H. Chen, Berkeley Heights, N.J.

[73] Assignee: Mobil Oil Corporation, New York, N.Y.

[21] Appl. No.: 932,051

[22] Filed: Nov. 18, 1986

Related U.S. Application Data

[63] Continuation-in-part of Ser. No. 808,973, Dec. 16, 1985, Pat. No. 4,658,079, which is a continuation-in-part of Ser. No. 709,143, Mar. 7, 1985, Pat. No. 4,568,786, which is a continuation-in-part of Ser. No. 598,139, Apr. 9, 1984, Pat. No. 4,520,221.

[51] Int. Cl.$^4$ .......................... B01J 29/04; B01J 27/14
[52] U.S. Cl. ...................................... 502/62; 502/77; 502/214

[58] Field of Search ............................ 502/77, 62, 214

[56] References Cited

U.S. PATENT DOCUMENTS

| | | | |
|---|---|---|---|
| 4,377,503 | 3/1983 | Dessau | 252/455 Z |
| 4,421,634 | 12/1983 | Olavesen | 208/111 |
| 4,452,909 | 6/1984 | Yang | 502/69 |
| 4,554,394 | 11/1985 | Forbus et al. | 585/474 |

Primary Examiner—Carl F. Dees
Attorney, Agent, or Firm—Alexander J. McKillop; Michael G. Gilman; L. G. Wise

[57] ABSTRACT

High VI lube oils are obtained in high yields when lower olefins are polymerized over an aluminosilicate HZSM-5 type catalyst or zeolite beta whose surface Brönsted acid sites have been inactivated with a sterically hindered basic organophosphorus compound.

13 Claims, No Drawings

ORGANOPHOSPHORUS-MODIFIED ZEOLITES AND METHOD OF PREPARATION

REFERENCE TO COPENDING APPLICATION

This is a continuation-in-part of application Ser. No. 808,973, filed Dec 16, 1985, now U.S. Pat. No. 4,658,079, which is a continuation-in-part of U.S. patent application Ser. No. 709,143, filed Mar 7, 1985, now U.S. Pat. No. 4,568,786, which is a continuation-in-part of U.S. patent application Ser. No. 598,139, filed Apr 9, 1964, now U.S. Pat. No. 4,520,221, incorporated herein by reference.

Field of the Invention

The invention relates to selective crystalline silicate catalyst material which is surface inactivated. These materials are useful for producing high viscosity index lubricant range hydrocarbons from a lower olefin feedstock.

BACKGROUND OF THE INVENTION

Recent work in the field of olefin upgrading has resulted in a catalytic process for converting lower olefins to heavier hydrocarbons. Heavy distillate and lubricant range hydrocarbons can be synthesized over ZSM-5 type catalysts at elevated temperature and pressure to provide a product having substantially linear molecular conformations due to the ellipsoidal shape selectivity of certain medium pore catalysts.

Conversion of olefins to gasoline and/or distillate products is disclosed in U.S. Pat. Nos. 3,960,978 and 4,021,502 (Givens, Plank and Rosinski) wherein gaseous olefins in the range of ethylene to pentene, either alone or in admixture with paraffins are converted into an olefinic gasoline blending stock by contacting the olefins with a catalyst bed made up of a ZSM-5 type zeolite. Particular interest is shown in a technique developed by Garwood, et al., as disclosed in European Patent Application No. 83301391.5, published 29 Sept. 1983. In U.S. Pat. Nos. 4,150,062; 4,211,640; 4,227,992; and 4,547,613 Garwood et al disclose the operating conditions for the Mobil Olefin to Gasoline/Distillate (MOGD) process for selective conversion of $C_3+$ olefins to mainly aliphatic hydrocarbons.

In the process for catalytic conversion of olefins to heavier hydrocarbons by catalytic oligomerization using a medium pore shape selective acid crystalline zeolite, such as ZSM-5 type catalyst, process conditions can be varied to favor the formation of hydrocarbons of varying molecular weight. At moderate temperature and relatively high pressure, the conversion conditions favor $C_{10}+$ aliphatic product. Lower olefinic feedstocks containing $C_2-C_8$ alkenes may be converted; however, the distillate mode conditions do not convert a major fraction of ethylene. A typical reactive feedstock consists essentially of $C_3-C_6$ mono-olefins, with varying amounts of nonreactive paraffins and the like being acceptable components.

SUMMARY OF THE INVENTION

It has been discovered that surface-inactivated internally active, metallosilicate medium pore zeolites may be produced by treatment with bulky organophosphorus base. It is a main object of this invention to provide an improved catalyst useful in shape selective reactions, such as upgrading olefins to lubricant product. Significantly improved product linearity can be achieved by employing a catalyst comprising a medium pore or larger pore shape selective siliceous zeolite with a surface that has been substantially inactivated with a sterically hindered basic organophosphorus compound or a sterically hindered organophosphonium cation.

Although it is known to use basic materials to deactivate the Brönsted acid sites on the surface of aluminosilicate catalysts, see U.S. Pat. No. 4,520,221 to C.S.H. Chen, incorporated herein by reference; the basic materials employed are bulky amines such as alkylpyridines. The basic organophosphorus compounds, which include phosphines and quaternary phosphonium cations, are excellent surface-modifying agents because they bind tightly to the Brönsted acid sites on the aluminosilicates, giving a more thermally stable catalyst.

DESCRIPTION

Several techniques may be used to increase the relative ratio of intra-crystalline acid sites to surface active sites. This ratio increases with crystal size due to geometric relationship between volume and superficial surface area. Deposition of carbonaceous materials by coke formation can also shift the effective ratio as disclosed in U.S. Pat. No. 4,547,613. However, enhanced effectiveness is observed where the surface acid sites of small crystal zeolites are reacted with a chemisorbed basic organophosphorus compound.

Zeolite catalysts can be surface inactivated in situ by cofeeding a sterically hindered basic organophosphorus compound with process feedstock and/or the catalyst can be treated in a separate step prior to conversion use.

Shape-selective oligomerization, as it applies to the conversion of $C_2-C_{10}$ olefins over ZSM-5, is known to produce higher olefins up to $C_{30}$ and higher. As reported by Garwood in Intrazeolite Chemistry 23, (Amer. Chem. Soc., 1983), reaction conditions favoring higher molecular weight product are low temperature (200-260° C.), elevated pressure (about 2000 kPa or greater), and long contact time (less than 1 WHSV). The reaction under these conditions proceeds through the acid-catalyzed steps of (1) oligomerization, (2) isomerization-cracking to a mixture of intermediate carbon number olefins, and (3) interpolymerization to give a continuous boiling product containing all carbon numbers. The channel systems of ZSM-5 type catalysts impose shape-selective constraints on the configuration of the large molecules, accounting for the differences with other catalysts.

The desired oligomerization-polymerization products include $C_{10}+$ substantially linear aliphatic hydrocarbons. The ZSM-5 catalytic path for propylene feed provides a long chain with approximately one lower alkyl (e.g. methyl) substituent per 8 or more carbon atoms in the straight chain.

The final molecular configuration is influenced by the pore structure of the catalyst. For the higher carbon numbers, the structure is primarily a methyl-branched straight olefinic chain, with the maximum cross section of the chain limited by the 5.4×5.6 Angstrom dimension of the largest ZSM-5 pore. Although emphasis is placed on the normal 1-alkenes as feedstocks, other lower olefins such as 2-butene or isobutylene, are readily employed as starting materials due to rapid isomerization over the acidic zeolite catalysts. At conditions chosen to maximize heavy distillate and lubricant range products ($C_{20}+$) the raw aliphatic product is essentially mono-olefinic. Overall branching is not extensive, with most branches being methyl at about one branch per eight or more atoms.

The viscosity index of a hydrocarbon lube oil is related to its molecular configuration. Extensive branching in a molecule usually results in a low viscosity index. It is believed that two modes of oligomerization/polymerization of olefins can take place over acidic zeolites such as HZSM-5. One reaction sequence takes place at Bronsted acid sites inside the channels or pores, producing essentially linear materials. The other reaction sequence occurs on the outer surface, producing more branched material. By decreasing the surface acid activity (surface $\alpha$-value) of such zeolites, fewer highly branched products with low VI are obtained.

DESCRIPTION OF THE PREFERRED EMBODIMENTS

Unless otherwise specified, metric units and parts-by-weight (pbw) are utilized in the description and examples.

The shape-selective oligomerization/polymerization catalysts preferred for use herein include the crystalline aluminosilicate zeolites having a silica to alumina molar ratio of at least 12, a constraint index of about 0.5 to 12 and acid cracking activity of about 50–400. Representative of the ZSM-5 type zeolites are ZSM-5, ZSM-11, ZSM-12, ZSM-22, ZSM-23, ZSM-35 and ZSM-38. ZSM-5 is disclosed and claimed in U.S. Pat. No. 3,702,886 and U.S. Pat. No. Re. 20,948; ZSM-11 is disclosed and claimed in U.S. Pat. No. 3,709,979. Also, see U.S. Pat. No. 3,832,449 for ZSM-12; U.S. Pat. No. 4,076,842 for ZSM-23; U.S. Pat. No. 4,016,245 for ZSM-35 and U.S. Pat. No. 4,046,839 for ZSM-38. The disclosures of these patents are incorporated herein by reference. A suitable shape selective medium pore catalyst for fixed bed is a small crystal H-ZSM-5 zeolite (silica:alumina ratio=70:1) with alumina binder in the form of cylindrical extrudates of about 1–5 mm. A large pore shape selective catalyst is a small crystal zeolite beta (silica alumina ratio=40:1) with alumina binder. Unless otherwise stated in this description, the catalyst shall consist essentially of ZSM-5, or zeolite beta which has a crystallite size of about 0.02 to 0.05 micron. Other pentasil catalysts which may be used in the primary or secondary reactor stages include a variety of medium to large pore ($\sim$5 to 8A) siliceous materials such as gallosilicates, ferrosilicates, and/or aluminosilicates disclosed in U.S. Pat. Nos. 4,414,413 and 4,417,088 and 3,308,069 (U.S. Pat. No. Re. 28,341), incorporated herein by reference.

The members of the class of zeolites useful herein have an effective pore size of generally from about 5 to about 8 angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolite ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size, e.g. less than 5 angstroms. On the other hand, zeolites which provide relatively free access to the internal zeolite structure have a low value for the Constraint Index, and usually pores of large size, e.g. greater than 8 angstroms. The method by which Constraint Index is determined is described fully in U.S. Pat. No. 4,016,218, incorporated herein by reference for details of the method.

Constraint Index (CI) values for some typical materials are:

| | CI (at test temperature) |
|---|---|
| ZSM-4 | 0.5 (316° C.) |
| ZSM-5 (crystal size - 0.2 to 0.5 microns) | 6–8.3 (371° C.–316° C.) |
| ZSM-5 (crystal size - 1–2 microns) | 7.2–13.3 (250° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-38 | 2 (510° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range of 0.5 to 12, depending on the temperature employed during the the test method within the range of 290° C. to about 538° C., with accompanying conversion between 10% and 60%, the CI may vary within the indicated range of 0.5 to 12 prior to surface treatment. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given untreated zeolite of interest herein within the approximate range of 0.5 to 12. It has been found that surface treatement with the bulky organophosphorus bases can increase the C.I. measurement by 20% or more. While this phenonenon is not fully understood, modification of pore structure may be effected. Such increase in constraint has not been previously known. For example, the C.I. for HZSM-5 can be increased from less than 10 up to about 40 by the novel phosphorus treatment technique.

It is generally understood that the proportion of internal acid sites relative to external acid sites increases with larger crystal size. However, the smaller crystallites, usually less than 0.1 micron, are preferred for diffusion-controlled reactions such as oligomerization, polymerization, etc. Accordingly, it may be required to neutralize more than 15% of the total Brönsted acid sites by chemisorption of the basic deactivating agent.

The degree of steric hindrance should also be considered in the choice of the basic organophosphorus compounds, especially the bulky quaternary phosphonium species. Although the selected organophosphorus compound must be bulky enough to prevent infusion of said compound into the internal pores of the catalyst, excessive steric hindrance may prevent effective or complete interaction between the surface Brönsted acid site and the selected basic species.

Catalysts of low surface activity can be obtained by using medium or larger pore zeolites of small crystal size that have been deactivated by basic organophosphorus compounds such as phosphines or quaternary phosphonium salts. These compounds all must have a minium cross section diameter greater than the effective pore size of the zeolite to be treated; i.e., greater than 5 Angstroms for a ZSM-5 type zeolite, and greater than 7.5 Angstroms for zeolite Beta.

EXAMPLE I

Aluminosilicate HZSM-5 particles, having an average crystal size of about 0.02 to 0.05 micron, are mixed with a solution (1%) of triphenylphosphine in hexane at room temperature for four days. The treated catalyst particles are then filtered, washed, and dried in an oven at 110° C. The dried product is quantitated against a standard compound (butyltriphenylphosphonium bromide) and it was determined that 2380 ppm phosphorus is chemisorbed on the catalyst particles. This amount of phosphorus corresponds to a basic exchange of 16.2% of all the Al acid sites on the catalyst.

The above-described treated catalyst particles are then tested for acid-catalyzed cracking reactions which will occur only on the surface of said catalyst. A feed of sterically-hindered 1,3,5-tri-tert-butylbenzene is passed over the treated HZSM-5 catalyst under standard cracking conditions of temperature and pressure. The molecule of 1,3,5-tri-tert-butylbenzene is geometrically too bulky to enter the internal pores of the catalyst, and thus can undergo cracking only on the surface of the catalyst. The results of the experiment confirm that no cracking reaction takes place, indicating that the treated HZSM-5 catalyst is surface-inactivated. The unmodified ZSM-5 is tested for constraint at 250° C., giving C.I. values of 6.4, 8.4, 9.6 and 9.6 at hexane cracking reaction times of 20, 50, 60 and 8 minutes, respectively. The corresponding values for the surface treated zeolite are 12.7, 13.0, 16.8 and 13.9 (83 min.)

EXAMPLE II

The surface-inactivated catalyst is prepared in the same manner as Example I except that the catalyst particles are a mixture of 65% HZSM-5 and 35% $Al_2O_3$. The amount of phosphorus chemisorbed on the catalyst is 1610 ppm.

EXAMPLE III

The surface-inactivated catalyst is prepared in the same manner as Example I except that the surface-modifying solution for treating the HZSM-5 catalyst particles is a solution (1%) of butyltriphenylphosphonium bromide in water. The amount of phosphorus chemisorbed on the catalyst is 350 ppm, which corresponds to a basic exchange of 2.3% of all the Al acid sites.

Despite the fact that not all of the surface acid sites on the catalyst are neutralized, the treated catalyst shows no cracking activity when 1,3,5-tri-tert-butylbenzene is employed as the feed.

EXAMPLE IV

The surface-inactivated catalyst is prepared in the same manner as Example I except that the surface-neutralizing solution for treating the HZSM-5 catalyst particles is a solution (1%) of tetraphenylphosphonium bromide. The amount of phosphorus chemisorbed on the catalyst was 410 ppm, which corresponds to a basic exchange of 2.7% of all the Al acid sites. The treated catalyst shows no activity under cracking conditions when 1,3,5-tri-tert-butylbenzene is employed as the feed. The C.I. value is increased from approximate 6-10 range to values of 40.1 (20 min.), 36.9 (40 min.), 20.6 (64 min.) and 15.4 (85 min).

EXAMPLE V

The surface-inactivated catalyst is prepared in the same manner as Example I except that the surface-neutralizing solution for treating the HZSM-5 catalyst particles is a solution (1%) of tetrabutylphosphonium bromide. The treated catalyst shows no activity under cracking conditions when 1,3,5-tri-tert-butylbenzene is employed as the feed.

EXAMPLE VI

The surface-inactivated catalyst is prepared in the same manner as Example I except that the surface-neutralizing solution for treating the HZSM-5 catalyst particles is a solution (1%) of tetraethylphosphonium chloride in water, and the mixing of catalyst and saline solution occurs for 6 days. The treated catalyst exhibits no cracking activity when a bulky feedstock such as 1,3,5-tri-tert-butylbenzene is employed.

EXAMPLE VII

The catalyst is prepared in the same manner as Example I except that the solution for treating the HZSM-5 catalyst particles is a solution (1%) of tetramethylphosphonium chloride in water. The amount of phosphorus chemisorbed on the catalyst is 3620 ppm, which corresponds to a basic exchange of 24.7% of all the Al acid sites. However, cracking occurs when the treated catalyst is contacted with 1,3,-5-tri-tert-butylbenzene. There are still active Al acid sites on the surface of the treated catalyst because the tetramethylphosphium ions, due to their smaller size, can migrate inside the zeolite pores. Therefore, an amount of internal Al acid sites are neutralized as well as an amount of surface Al acid sites. The remaining active surface Al acid sites are responsible for cracking the highly-branched feedstock.

EXAMPLE VIII

The surface-inactivated catalyst is prepared in the same manner as Example IV except that the catalyst particles are aluminosilicate zeolite Beta. The surface-modified catalyst shows no cracking activity when 1,3,5-tri-tert-butylbenzene is employed as the feedstock to a pressure reactor.

EXAMPLE IX

Lube Oil Preparation

A feedstock comprising 55 parts by weight propylene is charged to a pressure reactor containing 5 parts of untreated zeolite HZSM-5 particles as catalyst under inert atmosphere. When the reactor was heated to 230° C, the pressure was 6300 kPa (920 psi). After 5.2 hours, the pressure decreases to about 900 kPa (100 psi), and then to about 380 kPa (55 psi). After 43 hours GC analysis shows that the pale yellow product comprises a lube oil composition boiling at 343° C.+ (650° F.+) and having a viscosity index of 72. The overall yield of lube oil (343° C.+) is 28.2%.

EXAMPLE X

Lube Oil Preparation

The surface-inactivated catalyst of Example I is employed in a pressure reactor in an inert atmosphere for contacting a feedstock of propylene at 230° C. (446° F.). The ambient propylene pressure starts at 8108 kPa (1180 psi). After 19 hours, the pressure is decreased to about 1920 kPa (280 psi), and then to 275 kPa (40 psi) after 74 hours. The final product consists of lube oil (343° C.+) and lower boiling hydrocarbon liquids. Upon distillation, the nearly colorless lube oil (343° C.+) is found to have a viscosity index of 147. The overall yield of lube oil is 7.4%.

EXAMPLE XI

The surface-inactivated catalyst and propylene feed of Example IV are employed in a pressure reactor at 230° C. (446° F.). The initial ambient pressure is about 8100 kPa (1180 psi). During the polymerization, the pressure continually decreases until it reaches a value of about 400 kPa (60 psi) after four days. The final product is a nearly colorless liquid containing a lube oil (343° C.+) and lower boiling hydrocarbons. Upon distillation, the lube oil is found to have a viscosity index of 132. The overall yield of the lube oil is 19% after 8 days.

EXAMPLE XII

Lube Oil Preparation

The surface-inactivated catalyst and propylene feed of Example VIII are employed in a pressure reactor at 230° (446° F.). The initial pressure is 7150 kPa (1040 psi). During the polymerization, the pressure drops until it reaches a value of about 450 kPa (65 psi) after 6 days. The final product is a pale yellow liquid containing a lube oil fraction (343° C.+) and lower boiling hydrocarbons. Upon distillation, the lube oil fraction (calculated yield of 14.4%) is found to have a viscosity index of 153.

Multi-stage processing

The present invention may be employed advantageously in staged reactors wherein lower olefins (e.g. $C_2$-$C_4$) are upgraded to a substantially linear intermediate olefin in a primary stage and further converted to lubricant range ($C_{20}+$) hydrocarbons in a second stage at elevated pressure.

A lower olefinic feedstock, such as propene, butene, etc., is charged to a continuously operated series of fixed bed downflow reactors containing an amount of aluminosilicate HZSM-5 catalyst or related species such as zeolite beta. In combination with the lower olefinic feedstock, there is added to the first reactor, an amount of a sterically-hindered organophosphorus basic material, such as phosphines, said basic material being mixed with the feed at a rate sufficient to maintain surface inactivity in the catalyst. Quaternary phosphonium compounds which do not elute with the feed and hydrocarbon products are particularly useful. The organophosphorus material must be sterically-hindered to the degree that it will not enter the internal pores of the aluminosilicate catalyst. Preferably, triphenylphosphine is injected into the feed at a concentration of about 5 to 1000 ppm. The temperature within each of the downflow reactors is controlled to remain within the bounds of about 200° to 290° C. (392°-554° F.). While process pressure may be maintained over a wide range, usually from about 2000 to over 20,000 kPa (300-3000 psia), the preferred pressure is about 7000 to 15,000 kPa (1000 to 2000 psia).

In a typical continuous process run under steady state conditions using HZSM-5 catalyst, the average reactor temperature in the series of adiabatic fixed bed reactors is maintained below about 260° C. (500° F.). In order to optimize formation of high molecular weight $C_{10}+$ hydrocarbons, effluent temperature from the terminal reactor is kept substantially below about 290° C. (554° F).

The effluent mixture from the primary reactor enters a high temperature separator, wherein high boiling product is recovered as a liquid rich in $C_{10}{}^+$ hydrocarbons; while volatile components of the effluent stream, including light gas and lower hydrocarbons, such as $C_1$ to $C_9$ aliphatics are recovered as a vapor stream. Preferably, the major portion (e.g. 50% to more than 90 wt %) of $C_{10}{}^+$ hydrocarbon components are contained in the high boiling liquid fraction. Overhead vapor is withdrawn through a conduit, cooled indirectly by incoming feedstock in a heat exchanger to condense a major amount of $C_5$-$C_9$ gasoline range hydrocarbons for recovery. This condensed stream provides essentially all of the liquid olefinic recycle stream for combination with the feedstock. Advantageously, the major portion of $C_5$ to $C_9$ hydrocarbon components are contained in this liquified recycle stream; however, an optional recycle stream may be obtained from distilled raw gasoline. By controlling the reaction temperature, especially in the last bed, undesired cracking of the product $C_{10}^+$ hydrocarbons is minimized. Advantageously, both stages contain HZSM-5 catalyst and are operated continuously and/or batchwise. By contacting the primary stage heavy effluent fraction with an acid exchange resin or other adsorbent in a neutralizer between stages any residual organophosphorus base is removed. This step may not be necessary if no organophosphorus compound, such as the quaternary phosphonium ions, is eluted.

The secondary reactor usually is maintained at an average temperature less than about 260° C. at elevated pressure greater than about 2000 kPa and weight hourly space velocity less than 1 hr $^{-1}$. An olefinic intermediate stream comprising $C_{10}^+$ hydrocarbons is pressurized and heated prior to entering the secondary reactor for further oligomerization conversion to produce lubricant, raw olefinic gasoline, distillate, etc. The effluent may be cooled prior to flashing in a phase separator. Overhead containing gasoline, $C_4^-$ light gas, and light distillate may be recovered as product and/or recycled to the reactor stage(s).

Advantageously, the effluent liquid stream from the secondary reactor is fractionated to provide a major raw product stream consisting essentially of 290° C.+ aliphatic hydrocarbons comprising a major amount of $C_{10}$–$C_{20}$ distillate and $C_{20}$–$C_{60}$ aliphatic hydrocarbons. This raw olefinic product may then be hydrotreated in a separate process step to provide a paraffinic lubricant and/or heavy distillate product. Details of a mild hydrogenation treatment may be obtained from U.S. Pat. No. 4,211,640, incorporated by reference, typically using Co or Ni with W/Mo and/or noble metals. The hydrotreated stream may be further fractionated to yield refined high grade lubricants of outstanding quality.

While the invention has been described by specific examples and embodiments, there is no intent to limit the inventive concept except as set forth in the following claims.

I claim:

1. A surface-inactivated catalyst composition comprising a medium or large pore shape-selective siliceous zeolite material having active internal Bronsted acid sites and containing a surface-inactivating amount of an organophosphorus base or cation, the base or cation having an effective cross section larger than the zeolite pore.

2. The catalyst composition of claim 1 wherein said zeolite material comprises aluminosilicate having a silica-to-alumina mole ratio of at least 12 and a constraint index of about 0.5 to 12 prior to phosphorus compound surface treatment.

3. The catalyst composition of claim 2 wherein the aluminosilicate consists essentially of HZSM-5 having an acid cracking value of about 50 to 400 prior to treatment, and wherein surface acidity is neutralized by a quaternary phosphonium compound.

4. The catalyst composition of claim 1 wherein the organophosphorus base comprises at least one phosphine or phosphonium compound.

5. The catalyst composition of claim 4 wherein the organophosphorus compound comprises a tetraphenyl phosphonium salt.

6. The catalyst of claims 1 and 2 wherein the zeolite material comprises ZSM-5 type zeolites or zeolite beta.

7. A method of making a shape-selective catalyst comprising
contacting an acid medium pore zeolite having the structure of ZSM-5 with a solution of an organophosphorus deactivating agent to chemisorb said agent onto the zeolite surface for rendering said zeolite surface substantially inactive for acidic reaction, the deactivating agent comprising a tertiary phosphine or quaternary phosphonium compound having an effective cross-section greater than 5 Angstroms.

8. A surface-inactivated catalyst composition comprising a zeolite having the structure of ZSM-5 and having active internal Bronsted acid sites and containing no metals other than periodic group IIIB or IVB elements and having an acid cracking value of greater than 50 and containing a surface-inactivating amount of an organophosphorus base or cation, said base or cation having an effective cross-section larger than a zeolite pore.

9. The method of claim 7 wherein the zeolite catalyst having the structure of ZSM-5 has a constraint index less than 10 prior to treatment with the deactivating agent and a constraint index greater than 12 following treatment.

10. An improved medium pore siliceous zeolite material having internally active Bronsted acid sites and being surface inactivated by treatment with sufficient organophosphorus to increase substrate material constraint index by at least 20%, the organophosphorus having an effective cross-section larger than the zeolite pore.

11. The zeolite material of claim 10 wherein the pore size is about 5 to 8 Angstroms, wherein the untreated substrate has a constraint index less than 12, and the phosphorus-treated material has a constraint index of about 12 to 40.

12. The zeolite material of claim 11 wherein the substrate consists essentially of zeolite having the structure of ZSM-5 and containing no metals other than periodic group IIIB or IVB elements.

13. The zeolite material of claim 12 wherein the substrate consists essentially of aluminosilicate HZSM-5 having a constraint Index of about 6 to 10.

* * * * *